United States Patent [11] 3,624,177

| [72] | Inventor | Edwin Daniel Lowther<br>Ashford Common, England |
|---|---|---|
| [21] | Appl. No. | 37,863 |
| [22] | Filed | May 15, 1970 |
| [45] | Patented | Nov. 30, 1971 |
| [73] | Assignee | BP Chemicals Limited<br>London, England |
| [32] | Priority | June 10, 1969 |
| [33] | | Great Britain |
| [31] | | 29,360/69 |

[54] OLIGOMERIZATION OF OLEFINS
9 Claims, No Drawings

| [52] | U.S. Cl. | 260/683.15E, 252/443 |
|---|---|---|
| [51] | Int. Cl. | C07c 3/20, B01j 11/82 |
| [50] | Field of Search | 260/683.15 E; 252/443 |

[56] References Cited
UNITED STATES PATENTS

| 2,986,588 | 5/1961 | Schramm | 260/683.15 |
| 3,095,461 | 6/1963 | Wilkes | 260/683.15 |
| 3,251,895 | 5/1966 | Wilkes | 260/683.15 X |
| 3,398,131 | 8/1968 | Bloch et al. | 260/683.15 X |
| 3,424,814 | 1/1969 | Hambling et al. | 260/683.15 |

Primary Examiner—Paul M. Coughlan, Jr.
Attorney—Morgan, Finnegan, Durham & Pine

ABSTRACT: A catalyst suitable for the oligomerization of olefins, comprising metallic potassium, rubidium or cesium dispersed on anhydrous lithium carbonate. A process for the oligomerization of olefins which comprises contacting an olefin or mixture of olefins with said catalyst.

OLIGOMERIZATION OF OLEFINS

This invention relates to a novel oligomerization catalyst.

According to one aspect of the present invention there is provided a catalyst, suitable for the oligomerization of olefins, comprising metallic potassium, rubidium or cesium dispersed on anhydrous lithium carbonate.

Suitably the catalyst comprises 1-30 percent by weight of metallic potassium, rubidium or cesium, preferably 5 to 20 percent by weight, expressed as a percent by weight of lithium carbonate.

The Evaporating carbonate may be in the form of powder, granules (chips or beads) or pellets.

The catalyst may be prepared by stirring the molten metal with anhydrous lithium carbonate, heated to a temperature between the melting point of the metal and 400° C, preferably to between 100° and 300° C. It is particularly convenient to add the metal as a liquid alloy such as a sodium/potassium alloy when no heating is required to produce an adequate dispersion.

In an alternative preparation, the metal is dissolved in liquid ammonia, added to the lithium carbonate and the dispersion stirred vigorously. The liquid ammonia is then allowed to evaporate leaving a dispersion of the metal on the support.

In both of these preparations it is generally desirable to provide a blanket of an inert gas such as nitrogen, argon or helium during the preparation.

The catalyst may be pretreated before use by heating with hydrogen at atmospheric pressure or under increased pressure at a temperature in the range 50°–350° C, preferably for one-half hour or more. Alternatively the catalyst may be prepared in the presence of hydrogen.

The catalyst is suitable for use in the oligomerization of olefins such as propylene and n-butenes and co-oligomerization of mixtures such as propylene-ethylene, n-butenes-ethylene, isobutene-ethylene, n-pentenes-ethylene, proplylene-n-butenes and propylene-isobutene.

The products obtained from oligomerization in the presence of a catalyst according to the present invention are generally more linear than those obtained from other catalysts, including other alkali metal catalysts, e.g., sodium dispersed on anhydrous potassium carbonate. As an example of this is propylene-ethylene co-oligomerization, where the products are principally pentenes, mainly pentene-1, and heptenes, the heptenes being more than 50 percent linear. The pentenes may be recycled to increase the selectivity to heptenes to over 90 percent by weight. The heptene fraction obtained from other catalysts, including alkali metal catalysts such as sodium on potassium carbonate consists essentially of branched isomers, (e.g., linear heptenes from a sodium on potassium carbonate catalysed oligomerization usually form less than 25 percent of the heptene fraction).

Thus according to another aspect of the present invention there is provided a process for the oligomerization of olefins which process comprises contacting an olefin or mixture of olefins with a catalyst comprising metallic potassium, rubidium or cesium dispersed on anhydrous lithium carbonate at a temperature in the range 50° C. to 300° C. and a pressure in the range 0 to 4,000 p.s.i.g.

The reaction pressure is suitably sufficient to maintain the reactants in the liquid phase and is preferably in the range 500-2,000 p.s.i.g.

When two olefins are being co-oligomerized, e.g., ethylene and propylene, the molar ratio of one to the other is suitably initially in the range 6:1 to 1:6, preferably in the range 4:1 to 1:4.

The process may be carried out either in the presence or absence of a diluent. Preferred diluents are hydrocarbons, e.g., normally liquid paraffins.

The process may be carried out batchwise or in a continuous manner.

Preferably the feedstock will be free from impurities such as oxygen, water, sulfur compounds, dienes and acetylenes or will contain very low quantities of these materials. Preferably the total content of such impurities will be less than 0.1 percent by weight of the olefinic feedstock.

The oligomers produced in a process according to the present invention are useful as chemical intermediates to give a wide range of products, such as lubricants, adhesives, elastomers, plastics, pharmaceuticals, insecticides, repellants, etc. The heptenes are particularly useful in the production of $C_8$ oxo-alcohols from a hydroformylation reaction.

The invention is illustrated by the following examples.

EXAMPLE 1

Lithium carbonate was dried at 200° C. and 0.3 mm. mercury. Potassium metal was then added in sufficient quantity to make a dispersion containing 3.0 percent weight potassium. The mixture was stirred vigorously under a dry nitrogen blanket at 150° C. Part of the resulting catalyst (17.3 g.) was changed to a 1-liter autoclave under dry nitrogen; a 3:1 ethylene:propylene mixture was admitted to a pressure of 1,600 p.s.i.g. The autoclave was rocked at 150° C. for 16 hours and the products were then vented off into flasks cooled in solid carbon dioxide-acetone mixture. The propylene and ethylene wire allowed to evaporate and 43 g. of liquid oligomers were obtained. The products were found to consist of pentenes (50 percent weight), hexenes (6 percent weight) and heptenes (25 percent weight) of which 50 percent weight consisted of linear heptenes, and also material of higher boiling point (19 percent weight).

EXAMPLE 2

A catalyst was prepared by a similar method to that given in example 1 but containing 45 percent weight sodium, dispersed on anhydrous potassium carbonate. The resulting catalyst (46 g.) was charged to a 1-liter autoclave under dry nitrogen and a 3:1 molar ethylene-propylene mixture was admitted to a pressure of 1,500 p.s.i.g. The autoclave was rocked at 150° C. for 18 hours. Liquid oligomers (229 g.) were obtained which were found to consist of pentenes (14 weight), hexenes (4 percent weight), heptenes (57 percent weight) of which 20 percent were linear heptenes, and material of higher boiling point (25 percent weight).

By comparison with example 1 this shows the increased linearity of the heptenes obtained from the new catalyst.

EXAMPLE 3

A catalyst was prepared by a similar method to that given in example 1 but containing 5.0 percent weight potassium, dispersed on anhydrous lithium carbonate. The resulting catalyst (22.6 g.) was charged to a 1-liter autoclave under dry nitrogen and a 3:1 molar ethylene:propylene mixture was admitted to a pressure of 1,500 p.s.i.g. The autoclave was rocked at 150° C. for 16.5 hours. The results are shown in the table given after example 5.

EXAMPLE 4

A catalyst was prepared by a similar method to that outlined in example 1 but containing 7.0 percent weight potassium dispersed on anhydrous lithium carbonate. The resulting catalyst (21.4 g.) was charged to a 1-liter autoclave under dry nitrogen and a 3:1 molar ethylene:propylene mixture was admitted to a pressure of 1,400 p.s.i.g. The autoclave was rocked at 150° C. for 17 hours. The results are shown in the table given after example 5.

EXAMPLE 5

A catalyst was prepared by a similar method to that outlined in example 1 but containing 10.0 percent weight potassium dispersed on lithium carbonate. The resulting catalyst (27.9 g.) was charged to a 1-liter autoclave under dry nitrogen and a 3:1 molar ethylene:propylene mixture was admitted to a pressure of 1,500 p.s.i.g. The autoclave was rocked at 150° C. for 17 hours. The results are shown in the table below.

| Example No. | Percent weight dispersion of potassium | Weight of total product, g. | Percent weight | | | Heptenes, percent linear | Oligomers of higher boiling point |
| --- | --- | --- | --- | --- | --- | --- | --- |
| | | | Pentenes | Hexenes | Heptenes | | |
| 3 | 5.0 | 180 | 55 | 7 | 26 | 54 | 12 |
| 4 | 7.0 | 182 | 58 | 6 | 24 | 54 | 12 |
| 5 | 10.0 | 207 | 47 | 7 | 30 | 51 | 16 |

EXAMPLE 6

A catalyst was prepared by a similar method to that outlined in example 1, but containing 7 percent weight potassium dispersed on lithium carbonate. The resulting catalyst (19.5 g.) was charged to a 1-liter autoclave under dry nitrogen and propylene was admitted to a pressure of 1,500 p.s.i.g. The autoclave was rocked at 150° C. for 17 hours. The products were vented into flasks immersed in solid carbon dioxide-acetone mixtures. The products (13 g.) were distilled and found to contain hexenes (93 percent) and material of higher boiling point (7 percent). Of the hexanes produced 92 percent consisted of 4-methylpent-1-ene.

EXAMPLE 7

A catalyst was prepared by a similar method to that outlined in example 1, but containing 10 percent weight potassium dispersed on lithium carbonate. The resulting catalyst (57.2 g.) was charged to a 1-liter autoclave under dry nitrogen and a 2:1 but-1-ene:propylene mixture was admitted to a pressure of 1,200 p.s.i.g. The autoclave was rocked at 150° C. for 17 hours. The products were vented into flasks immersed in solid carbon-dioxide acetone (90 percent) The products (29.0 g.) were distilled and found to contain hexenes (41 percent), heptenes (56 percent) and material of higher boiling point (3 percent). Most of the heptene product consisted of 5-methyl hexenes (62 percent).

EXAMPLE 8

A catalyst was prepared by a similar method to that outlined in example 1, but containing 10 percent weight potassium dispersed on lithium carbonate. The resulting catalyst (10.0 g.) was charged to a 1-liter autoclave under dry nitrogen and a 1:1 butene:ethylene mixture was admitted to a pressure of 1,400 p.s.i.g. The autoclave was rocked at 150° C. for 17 hours. The products were vented into flasks immersed in solid carbon-dioxide mixtures. The products (82 g.) were distilled and found to contain hexenes (90 percent) of which 23 percent was linear hexenes, and material of higher boiling point (10 percent).

EXAMPLE 9

A catalyst was prepared by a similar method to that outlined in example 1, but containing 10 percent weight potassium dispersed on lithium carbonate. The resulting catalyst (39.1 g.) was charged to a 1-liter autoclave under dry nitrogen. Dry pent-2-ene (700 ml.) was added and ethylene was admitted to a pressure of 1,500 p.s.i.g. The autoclave was rocked at 130° C. for 17 hours. The products were vented into flasks immersed in solid carbon dioxide-acetone mixtures. The products were distilled and found to contain heptenes (86 percent) of which 43 percent was linear heptenes, and material of higher boiling point (14 percent).

EXAMPLE 10

Lithium carbonate was dried at 200° C. and 0.3 mm. of mercury. Sodium/potassium alloy was added (23 parts by weight sodium to 67 potassium) in sufficient quantity to make a dispersion containing 17 percent alloy. The mixture was stirred vigorously under a dry nitrogen blanket at ambient temperature. Part of the resulting catalyst (29.9 g.) was charged to a 1-liter autoclave under dry nitrogen. Pent-2-ene (500 ml.) was added and ethylene was admitted to a pressure of 1,000 p.s.i. The autoclave was rocked at 150° C. for 17 hours and the products were then vented into flasks cooled in solid carbon dioxide-acetone mixtures. The products (407 g.) were distilled and found to contain heptene (65 percent) of which 33 percent was linear heptenes, and material of higher boiling point (35 percent).

I claim:

1. A catalyst suitable for the oligomerization of olefins consisting essentially of an alkali metal selected from potassium, rubidium or cesium dispersed on anhydrous lithium carbonate wherein said alkali metal is present in amount 1 to 30 percent by weight expressed as a percentage by weight lithium carbonate.

2. A process for the preparation of a catalyst as claimed in claim 1 which process comprises stirring a molten alkali metal selected from potassium, rubidium or cesium with anhydrous lithium carbonate heated at a temperature between the melting point of the metal and 400° C.

3. A process according to claim 2 wherein the catalyst is pretreated before use by heating with hydrogen at atmospheric or superatmospheric pressure at a temperature in the range 50° to 350° C.

4. A process according to claim 2 wherein the catalyst is prepared in the presence of hydrogen.

5. A process as claimed in claim 2 wherein a blanket of an inert gas selected from nitrogen, argon or helium is provided during catalyst preparation.

6. A process for the preparation of a catalyst as claimed in claim 1 which process comprises stirring an alkali metal selected from potassium, rubidium or cesium in the form of a liquid alloy with anhydrous lithium carbonate.

7. A process for the preparation of a catalyst as claimed in claim 1 which process comprises the steps of:
   A. Dissolving an alkali metal selected from potassium, rubidium or cesium in liquid ammonia.
   B. Adding the solution of stage A to lithium carbonate.
   C. Stirring vigorously and
   D. Evaporating the liquid ammonia.

8. A process for the oligomerization of olefins which process comprises contacting an olefin or mixture of olefins with an oligomerization catalyst as claimed in claim 1 at a temperature in the range 50° to 300° C. and a pressure in the range 0 to 4,000 p.s.i.g.

9. A process according to claim 8 wherein the mixture of olefins contains two olefins in a molar ratio of 1 to the other initially in the range 6:1 to 1:6.

* * * * *